(12) United States Patent
Khan et al.

(10) Patent No.: US 12,361,015 B2
(45) Date of Patent: Jul. 15, 2025

(54) SYSTEMS AND METHODS FOR ON-DEMAND DISTRIBUTED LEDGER ESTABLISHMENT

(71) Applicant: Verizon Patent and Licensing Inc., Basking Ridge, NJ (US)

(72) Inventors: Ahmed A. Khan, Plano, TX (US); Khaliq Raza, Wesley Chapel, FL (US); Donna L. Rodela, Colorado Springs, CO (US); Nityanand Sharma, Tampa, FL (US); Syed R. Noor, Chantilly, VA (US); Abubakar Syed, Tampa, FL (US); Jeaha Yang, Darien, CT (US); Andrew Buford, Columbus, OH (US); Rangesh Sripathi, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 143 days.

(21) Appl. No.: 18/150,363

(22) Filed: Jan. 5, 2023

(65) Prior Publication Data
US 2024/0232221 A1 Jul. 11, 2024

(51) Int. Cl.
G06F 16/27 (2019.01)
G06F 8/61 (2018.01)
H04L 9/40 (2022.01)

(52) U.S. Cl.
CPC ............... *G06F 16/27* (2019.01); *G06F 8/63* (2013.01); *H04L 63/101* (2013.01)

(58) Field of Classification Search
None
See application file for complete search history.

(56) References Cited

U.S. PATENT DOCUMENTS

| 10,251,053 | B1 * | 4/2019 | Paczkowski | H04W 8/22 |
| 10,884,725 | B2 * | 1/2021 | Nyamars | G06Q 20/02 |
| 11,100,510 | B1 * | 8/2021 | Wyner | G06F 21/602 |
| 11,126,945 | B2 * | 9/2021 | Nagai | G06Q 10/067 |
| 11,238,448 | B1 * | 2/2022 | Narayanan | G06Q 20/127 |

(Continued)

OTHER PUBLICATIONS

Pradeep, "Designing a fast distributed ledger blockchain", 2019, https://medium.com/@pradeep_thomas/designing-a-fast-distributed-ledger-blockchain-49dd5f5e0965 (Year: 2019).*

(Continued)

*Primary Examiner* — Hossain M Morshed

(57) ABSTRACT

A system described herein may receive a distributed ledger creation request that specifies a quantity of nodes. The system may provision a plurality of sets of hardware resources to implement a set of nodes which includes the requested quantity of nodes. Provisioning the plurality of sets of hardware resources may include generating communication information associated with each node of the set of nodes. The system may instruct at least one node, of the set of nodes, to establish a distributed ledger. The at least one node may communicate with one or more other nodes of the set of nodes to establish the distributed ledger. The system may output, in response to the distributed ledger creation request, communication information associated with one or more nodes of the plurality of nodes. The communication information may be used to interact with the established distributed ledger.

20 Claims, 12 Drawing Sheets

(56) References Cited

U.S. PATENT DOCUMENTS

| | | | |
|---|---|---|---|
| 11,416,944 B1* | 8/2022 | Floyd | G06F 16/27 |
| 11,941,021 B2* | 3/2024 | Klein | G06F 8/61 |
| 11,989,279 B2* | 5/2024 | Thakur | G06F 21/602 |
| 2018/0374062 A1* | 12/2018 | Hunter | G06Q 20/4016 |
| 2019/0104196 A1* | 4/2019 | Li | G06Q 20/3823 |
| 2019/0311147 A1* | 10/2019 | Gollogly | H04L 9/50 |
| 2019/0379545 A1* | 12/2019 | Wong | H04L 9/3239 |
| 2020/0218815 A1* | 7/2020 | Haque | G06F 21/645 |
| 2020/0372043 A1* | 11/2020 | Aseev | G06F 21/64 |
| 2020/0379982 A1* | 12/2020 | Ozawa | G06F 16/27 |
| 2021/0004297 A1* | 1/2021 | Scrivner | G06F 11/1451 |
| 2021/0029163 A1* | 1/2021 | Behl | H04L 67/1097 |
| 2021/0124760 A1* | 4/2021 | Klein | G06F 8/61 |
| 2021/0132912 A1* | 5/2021 | Trillo Vargas | G06Q 10/103 |
| 2021/0326212 A1* | 10/2021 | Scrivner | G06F 11/1451 |
| 2021/0382872 A1* | 12/2021 | Tang | G06F 16/27 |
| 2022/0012367 A1* | 1/2022 | Ramanan | G06N 3/08 |
| 2022/0083537 A1* | 3/2022 | Malvankar | G06F 16/2379 |
| 2022/0261804 A1* | 8/2022 | Concannon | G06Q 20/405 |
| 2022/0263671 A1* | 8/2022 | Liu | H04L 9/50 |
| 2022/0335038 A1* | 10/2022 | Sato | G06F 16/27 |
| 2024/0160640 A1* | 5/2024 | Aseev | G06F 16/27 |
| 2024/0232221 A1* | 7/2024 | Khan | G06F 16/27 |

OTHER PUBLICATIONS

Chirag, "How to Choose a Blockchain Platform that Speeds Your Business Growth," available at https://appinventiv.com/blog/choose-best-blockchain-development-platform/ (Mar. 31, 2022).

Hyperledger, "Ledger," available at https://github.com/hyperledger/fabric/blob/main/docs/source/ledger/ledger.md (May 6, 2022).

Kubernetes, "Overview," Kubernetes Documentation, available at https://kubernetes.io/docs/concepts/overview/ (Nov. 24, 2022).

Kubernetes, "Cluster Architecture," Kubernetes Documentation, available at https://kubernetes.io/docs/concepts/architecture/ (Jun. 16, 2021).

* cited by examiner

SYSTEMS AND METHODS FOR ON-DEMAND DISTRIBUTED LEDGER ESTABLISHMENT

BACKGROUND

Distributed ledgers, such as blockchains, provide for the decentralized and secure storage of data. Distributed ledgers may further provide for the immutability of recorded data, as data may not be altered once recorded to a distributed ledger. Distributed ledgers may utilize mechanisms such as cross-validation to verify that local copies of the distributed ledger, as maintained by individual nodes, match the local copies of the distributed ledger maintained by some or all of the other nodes that maintain the distributed ledger, and may therefore be resilient against tampering. Nodes associated with a distributed ledger may be implemented by hardware resources that are independent of each other, geographically distributed, and/or otherwise separate.

DETAILED DESCRIPTION OF EXAMPLE EMBODIMENTS

The following detailed description refers to the accompanying drawings. The same reference numbers in different drawings may identify the same or similar elements.

Figure 1:
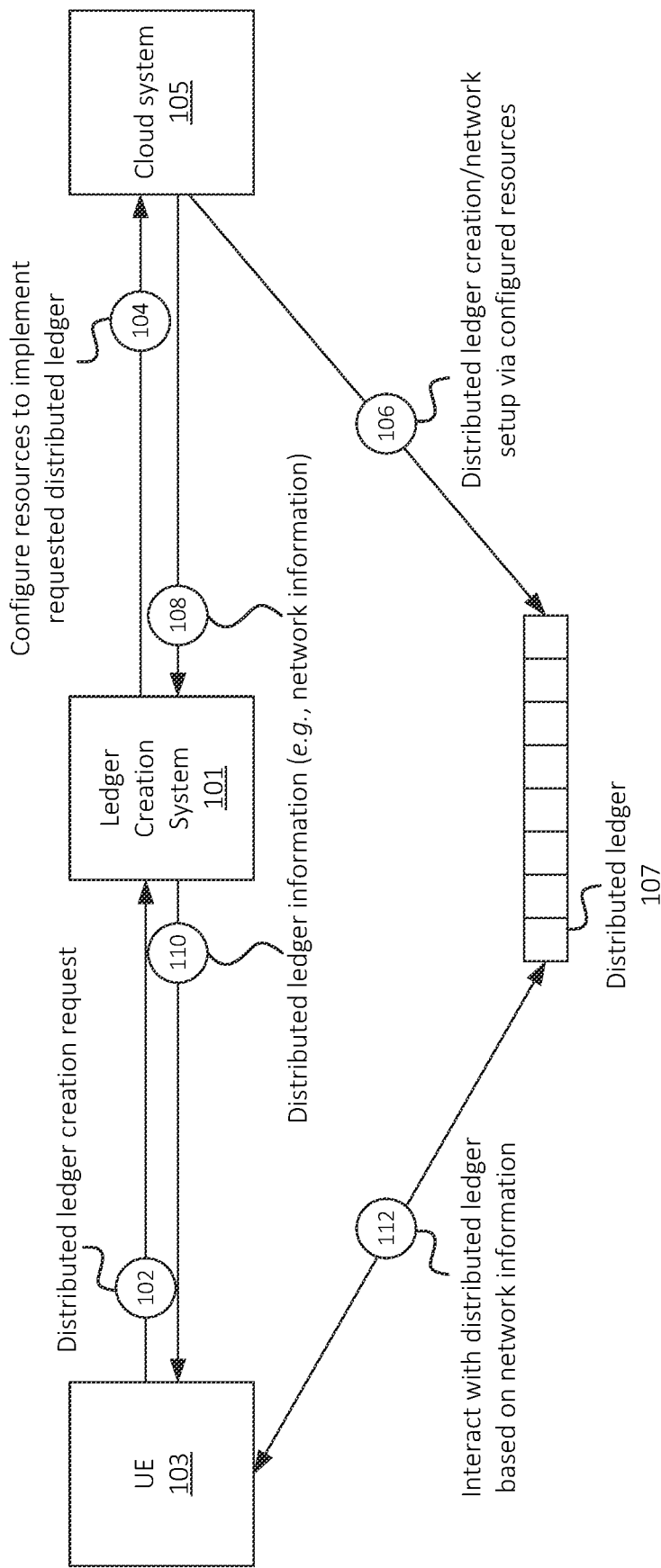
FIG. 1 illustrates an example overview of one or more embodiments described herein.

Embodiments described herein provide for a simplified, on-demand creation of a distributed ledger as well as a network of nodes to maintain the distributed ledger. For example, as shown in FIG. 1, Ledger Creation System ("LCS") 101 may receive (at 102) a distributed ledger creation request from User Equipment ("UE") 103 (e.g., a mobile phone, a laptop, a tablet, a workstation, and/or some other source). For example, LCS 101 and UE 103 may communicate via a network such as the Internet, a private network, or the like. LCS 101 may offer an application programming interface ("API"), a web portal, and/or other suitable communication pathway via which LCS 101 may receive (at 102) the request. The distributed ledger creation request may indicate, for example, that a user of UE 103 is requesting that a distributed ledger network be established, where such distributed ledger network maintains one or more distributed ledgers that may be accessed by UE 103 and/or other authorized devices, users, applications, etc. In the figures, the term "ledger" is used in place of the term "distributed ledger" for the sake of brevity.

In some embodiments, the ledger creation request may be made based on selections of one or more user interface elements presented by LCS 101 and/or some other suitable device or system. For example, LCS 101 may provide a web portal, a graphical user interface ("GUI"), etc. that includes selectable options for the requested distributed ledger. Additionally, or alternatively, the request may be "pushed" by UE 103, may be sent in accordance with one or more APIs associated with LCS 101, etc.

As discussed in more detail below with respect to FIGS. 2 and 3, LCS 101 may identify one or more images, applications, modules, etc. to implement the requested distributed ledger. LCS 101 may also identify hardware requirements or parameters of nodes to maintain the distributed ledger. LCS 101 may configure (at 104) a set of hardware resources, such as one or more hardware resources of cloud system 105, to implement the nodes in accordance with such hardware requirements or parameters. For example, LCS 101 may instruct (at 104) cloud system 105 to provision a particular quantity of virtual machines, containers, etc. based on a requested quantity of nodes. The nodes may be provisioned in accordance with hardware specifications or parameters indicated in the request and/or otherwise determined by LCS 101, such as particular processor specifications, storage specifications, network specifications, etc. LCS 101 may also provide (at 104) images, applications, etc. that may be executed by the nodes in order to implement one or more suitable functions to maintain the requested distributed ledger. For example, such images may be distributed ledger framework images which, when executed, perform operations related to maintain the distributed ledger, such as generating a genesis block or record, computing hashes or other values based on records in the distributed ledger, cross-validating records to be recorded to the distributed ledger, and/or other suitable operations.

As discussed in greater detail below with respect to FIGS. 3-6, cloud system 105 may perform (at 106) an establishment of the distributed ledger (e.g., distributed ledger 107, in the examples discussed herein), including an establishment of a distributed ledger network to maintain distributed ledger 107. As discussed below with respect to FIG. 7, cloud system 105 may provide (at 108) information associated with the established distributed ledger 107 and/or the nodes to LCS 101, which may forward (at 110) some or all of such information to UE 103 and/or other devices or systems (e.g., devices or systems indicated in an access list associated with the distributed ledger creation request), based on which UE 103 may interact (at 112) with the established distributed ledger 107. For example, UE 103 may use the provided distributed ledger network information to communicate with one or more of the established nodes in order to access information recorded to distributed ledger 107, record new information to distributed ledger 107 (e.g., to record a smart contract, a record, a non-fungible token ("NFT"), and/or other suitable information), and/or other suitable operations.

In this manner, a requestor may establish a fully functional distributed ledger, along with its properties of decentralization, immutability, and security, without needing to manually configure or have any knowledge of the underlying hardware and/or networking resources. For example, in accordance with embodiments described herein, a requestor may be able to establish a distributed ledger of any type or framework of the requestor's preference with potentially dozens, hundreds, or thousands of nodes without needing to manually provision each node, install distributed ledger framework images or modules at each node, configure network communications between each node, and/or other distributed ledger network infrastructure setup. As such, the embodiments described herein may provide for a simplified, streamlined, user-friendly, and accessible distributed ledger establishment procedure.

Figure 2:
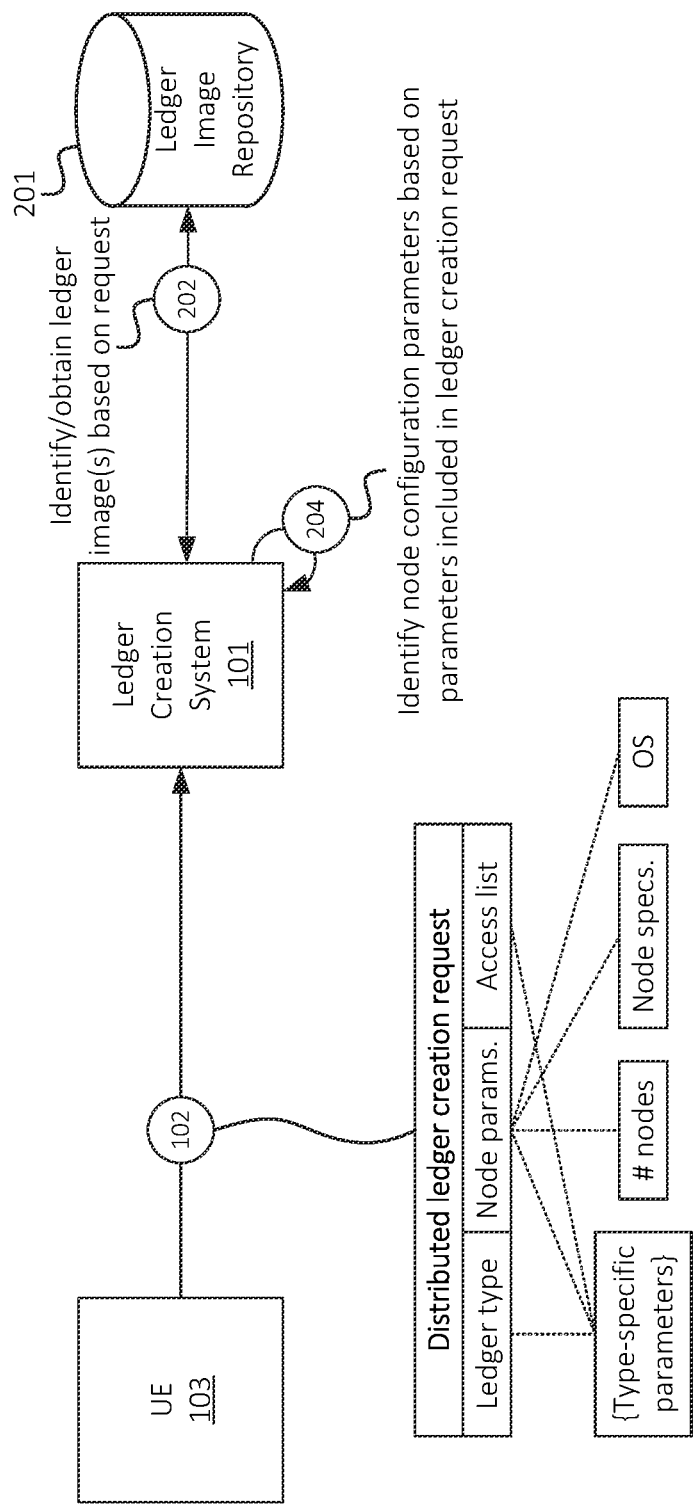
FIG. 2 illustrates an example of a distributed ledger creation request, in accordance with some embodiments.

As shown in FIG. 2, the distributed ledger creation request (at 102) may include parameters of a requested distributed ledger to be established on behalf of a requestor (e.g., a user, application, or other entity associated with UE 103). Such parameters may include, as represented in the figure as "ledger type," a framework, set of protocols, type, etc. of distributed ledger (e.g., a Hyperledger Fabric ("HLF") framework, an Ethereum Virtual Machine ("EVM") framework, a proprietary or custom type of distributed ledger, etc.). The distributed ledger creation request may include a set of type-specific parameters, that are associated with the particular framework, type, etc. of requested distributed ledger. For example, a distributed ledger request associated with an HLF framework may include ledger-specific parameters that are specific to the HLF framework, such as specifications or parameters of a world state database associated with a distributed ledger established according to the HLF framework. Generally, for example, the HLF framework may include a world state database that includes portions of information associated with the distributed ledger, such as up-to-date values, processed data, condensed data, etc. The type-specific parameters associated with the HLF framework may for example, include parameters related to the world state database such as database maximum size parameters, database garbage collection parameters, database schema, etc.

As another example, type-specific parameters may include a version number, distribution, or other identifier of a particular version of ledger type being requested. In some embodiments, type-specific parameters may include any other suitable parameter or configuration information that is specific to one or more given distributed ledger types, frameworks, etc.

As further shown, the distributed ledger creation request may include parameters of nodes to implement the requested distributed ledger. As discussed above, nodes of a distributed ledger may be separate and/or independent devices, systems, sets of hardware resources, virtual machines, etc. that each maintain a local of the distributed ledger and/or perform other operations with respect to the distributed ledger. Such other operations may include cross-validating records of the distributed ledger, proposing new records to record to the distributed ledger, sequencing records recorded to the distributed ledger, and/or other suitable operations.

The node parameters may include, for example, a quantity of nodes requested to maintain the distributed ledger. The node parameters may include, in some embodiments, specifications or parameters of some or all of the nodes, such as hardware resource specifications or minimum requirements (e.g., quantity or type of processor, type or amount of storage space, type or amount of memory, minimum network throughput, etc.). In some embodiments, the node parameters may indicate a particular type of operating system ("OS") to install on some or all of the nodes, libraries, images, applications, and/or other types of functionality to include at each node.

In some embodiments, node parameters may also be type-specific parameters associated with a particular distributed ledger type. For example, an HLF framework or other distributed ledger framework may include nodes with different roles, such as managing peer, committing peer, ordering peer, peer (e.g., a node without a specific role or with a "base" set of roles), or the like. The node parameters included in the distributed ledger request may include different specifications for nodes that implement different roles. For example, the distributed ledger creation request may specify a first set of hardware specifications (e.g., a first minimum processor clock speed) for a first type of node, and may specify a different second set of hardware specifications (e.g., a higher second minimum processor clock speed) for a second type of node.

In some embodiments, the distributed ledger creation request may include an access list and/or other authentication information, based on which access to the requested distributed ledger may be private, restricted, etc. For example, the requested distributed ledger may be a "private distributed ledger" or a "permissioned distributed ledger," for which only users or devices specified in the access list may access records maintained in the distributed ledger, and/or for which only users or devices specified in the access list may provide new information to be recorded to the distributed ledger. In some embodiments, the access list may include user names, device identifiers (e.g., International Mobile Station Equipment Identity ("IMEI") values, International Mobile Subscriber Identity ("IMSI") values, Mobile Directory Number ("MDN") values, Internet Protocol ("IP") addresses, etc. associated with one or more UEs 103), cryptographic keys, authentication tokens, and/or other suitable authentication mechanisms by which authorized users or devices may be authenticated.

In some embodiments, the access list may include type-specific access parameters. For example, some users or devices may be authorized to access certain nodes or types of nodes while other users or devices may not be authorized to access the same nodes or types of nodes. In the example of a distributed ledger associated with an HLF framework, one user or UE 103 may be authorized to communicate with an HLF ordering peer, while another user or UE 103 may not be authorized to communicate with the same HLF ordering peer.

In some embodiments, the distributed ledger creation request may include additional information, less information, and/or different information. For example, in some embodiments, the distributed ledger creation request may include parameters, criteria, etc. relating to geographical distribution and/or geographical locations of requested nodes. For example, the distributed ledger creation request may specify particular geographical regions (e.g., cities, latitude and longitude coordinate boundaries, physical addresses or address ranges, and/or other geographical locations or boundaries) in which particular nodes are requested. As another example, the distributed ledger creation request may specify a minimum geographical distance between nodes, a maximum geographical distance between nodes, a constraint indicating a maximum quantity of nodes implemented within a particular datacenter or within a particular geographical area, and/or other suitable location-based criteria, constraints, or requirements.

Based on receiving (at 102) the distributed ledger creation request, LCS 101 may identify and/or obtain (at 202) one or more distributed ledger framework images, modules, or the like from distributed ledger image repository 201. Ledger image repository 201 may in some embodiments, be implemented by a storage device or set of storage devices that is or are remote from one or more devices that implement LCS 101. In some embodiments, ledger image repository 201 may be implemented by a storage device or set of storage devices that is integrated in, is directly connected to, is co-located with, etc. LCS 101.

Ledger image repository 201 may include images, executable files, libraries, etc. (referred to below simply as "images" for the sake of brevity) associated with one or more different distributed ledger types, frameworks, etc. In some embodiments, LCS 101 may compare parameters of the distributed ledger creation request to corresponding parameters, metadata, identifiers, etc. of images stored by ledger image repository 201. LCS 101 may select one or more images from ledger image repository 201 based on identifying images that exactly match parameters specified in the distributed ledger creation request (e.g., an exact match of a distributed ledger type or version). Additionally, or alternatively, LCS 101 may perform artificial intelligence/machine learning ("AI/ML") techniques or other suitable analysis techniques to identify a "best match," "closest match," etc. of image or images based on the parameters of the distributed ledger creation request. In this manner, the images may be selected (at 202) based on some or all of the parameters included in the distributed ledger creation request.

LCS 101 may further identify (at 204) node configuration parameters based on the parameters included in the distributed ledger creation request. For example, LCS 101 may identify a quantity of nodes, hardware specifications for the nodes, and/or other suitable parameters. In some embodiments, LCS 101 may identify node parameters based on the obtained node images and/or based on other information. For example, particular node images may have minimum requirements, library dependencies, OS dependencies, etc. In some embodiments, even if the distributed ledger creation request does not include certain node parameters, LCS 101 may identify such node parameters based on constraints, requirements, etc. associated with node images obtained from ledger image repository 201. For example, a particular distributed ledger type may specify a minimum set of nodes that perform particular roles, and LCS 101 may identify that nodes that implement such roles should be provisioned, instantiated, etc. in order to satisfy the request, even in instances where the request does not explicitly request or indicate that such nodes should be provisioned.

Figure 3:
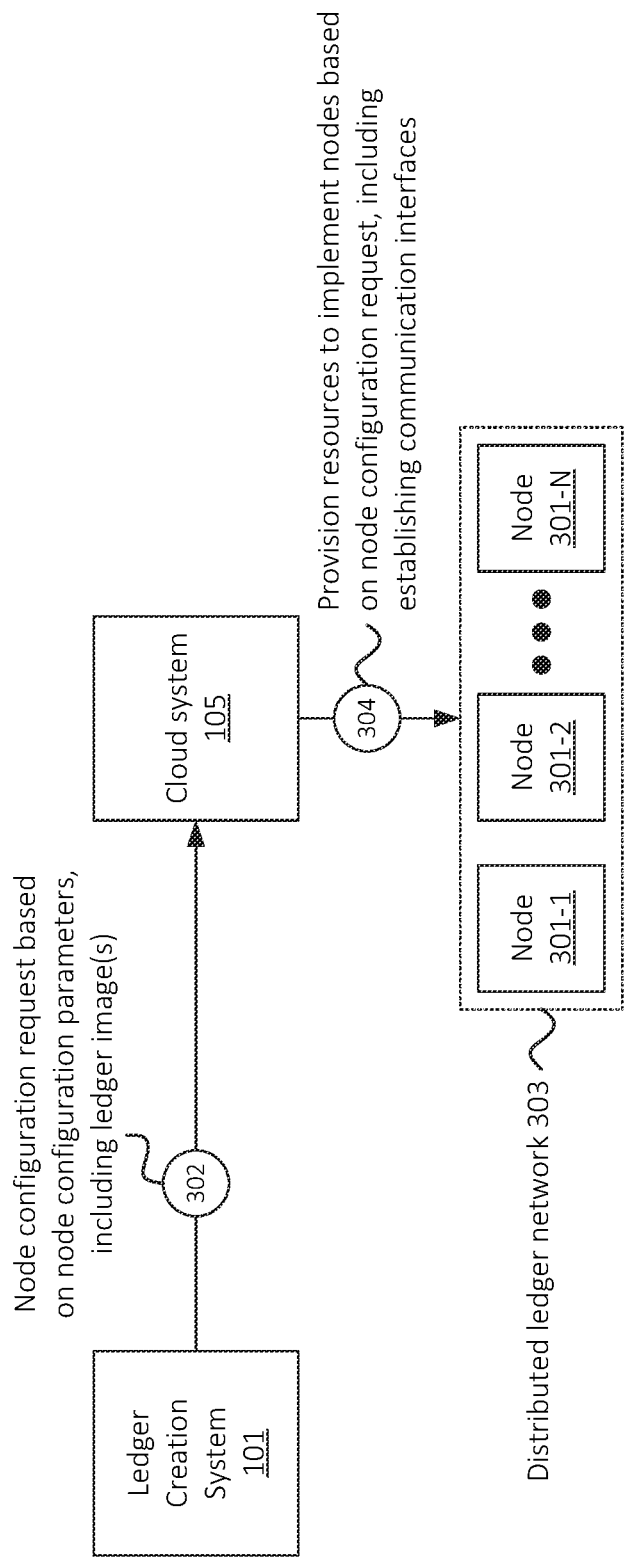
FIG. 3 illustrates an example of provisioning hardware resources to implement nodes based on a distributed ledger creation request, in accordance with some embodiments.

As shown in FIG. 3, configuring (e.g., at 104) cloud system 105 to provision resources to implement the nodes to maintain the requested distributed ledger may include providing (at 302) a node configuration request to cloud system 105. The node configuration request may include the node parameters such as hardware specifications, quantity of nodes, etc. The node configuration request may include some or all of the images to install on the nodes. In some embodiments, cloud system 105 may include or implement a Kubernetes-based system or some other type of virtualization environment, which may be capable of creating nodes 301 by provisioning hardware resources associated with cloud system 105. For example, cloud system 105 may provision (at 304) a virtual machine, a Kubernetes node, and/or some other addressable or discrete system implemented by a set of hardware resources associated with cloud system 105 for each node 301. In this manner, cloud system 105 may establish distributed ledger network 303 that includes the nodes 301 that implement the requested distributed ledger. For example, a first node 301-1 of distributed ledger network 303 may be associated with a first virtual machine, a first Kubernetes node, etc. A second node 301-2 of distributed ledger network 303 may be associated with a second virtual machine, a second Kubernetes node, etc.

In some embodiments, when provisioning (at 304) resources to implement distributed ledger network 303, cloud system 105 may conform to location-based criteria, requirements, or constraints specified in the distributed ledger creation request. For example, if the distributed ledger creation request specifies that all nodes 301 should be implemented at least 50 kilometers away from each other, cloud system 105 may provision hardware resources that are at least 50 kilometers away from each other to implement each of nodes 301. As another example, if the distributed ledger creation request specifies that at least two nodes 301 should be implemented at least 100 kilometers away from each other, cloud system 105 may provision hardware resources that are at least 100 kilometers away from each other to implement nodes 301-1 and 301-2, and may select hardware resources to implement the other nodes 301 of distributed ledger network 303 independently of location-based criteria, since the criteria specified in this example distributed ledger creation request has been met.

Figure 4:
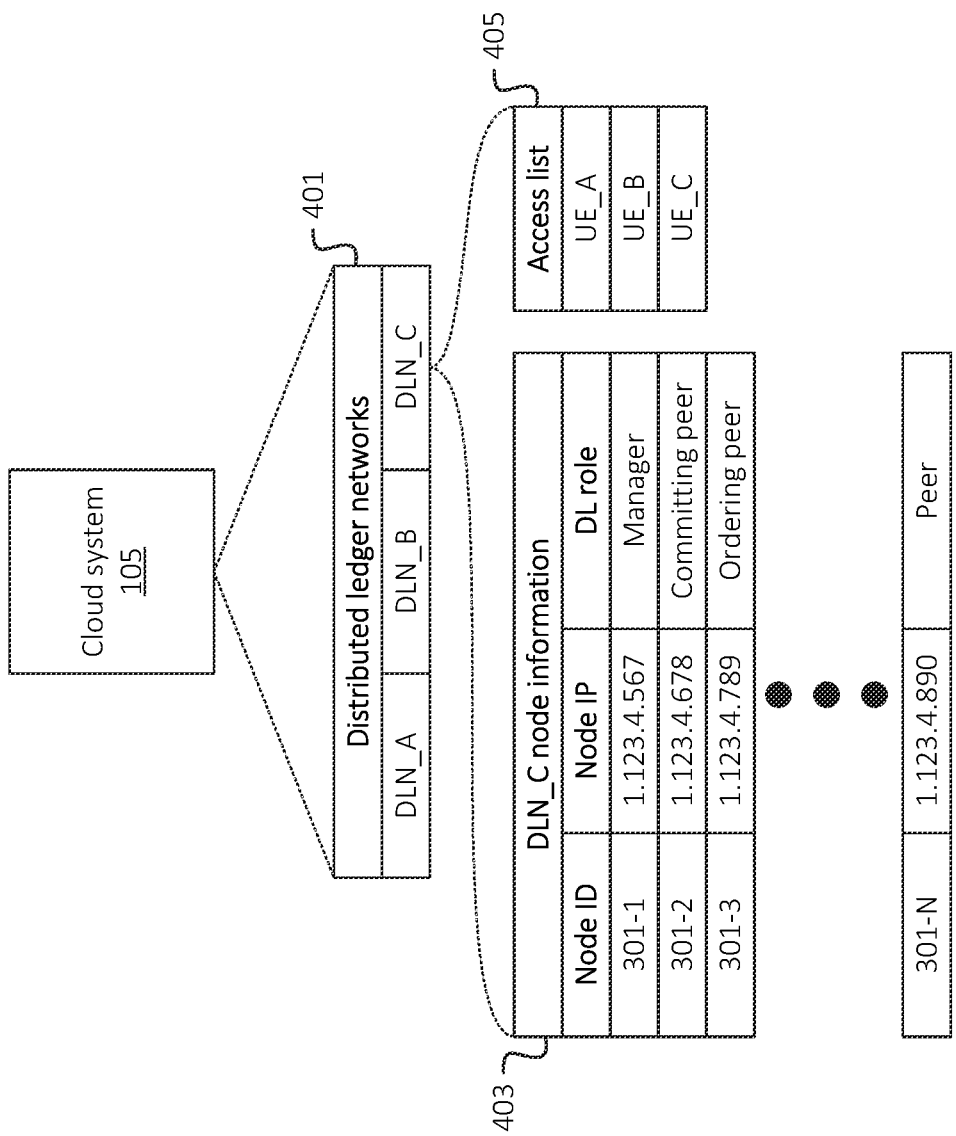
FIG. 4 illustrates example communication information associated with nodes implemented by provisioned hardware resources, in accordance with some embodiments.

As shown in FIG. 4, cloud system 105 may further maintain distributed ledger network information 401 associated with one or more distributed ledger networks 303. For example, distributed ledger network information 401, as shown in FIG. 4, may include information associated with three example distributed ledger networks 303, represented as "DLN_A" (e.g., a first distributed ledger network 303), "DLN_B" (e.g., a second distributed ledger network 303), and "DLN_C" (e.g., a third distributed ledger network 303). The information for each distributed ledger network 303 may include communication information, node role information, an access list associated with the respective distributed ledger network 303, and/or other suitable information.

For example, the information for a particular distributed ledger network 303 (e.g., DLN_C in this example) may include node information 403 and access list 405. Node information 403 may include names and/or other suitable identifiers of particular nodes 301 associated with the particular distributed ledger network 303 (i.e., nodes 301-1 through 301-N, in this example). The communication information for a given node may include an IP address, a port number, routing information, network address translation ("NAT") information, and/or other suitable information that may be used to communicate with each node 301 (e.g., via the Internet, via a network or system that is external to cloud system 105, etc.). For example, the IP address for a given node 301 may be a "public" IP address that may be used to route traffic to such node 301 by one or more devices or networks that are external to cloud system 105. Such communication information may be generated by cloud system 105 as part of or in conjunction with the provisioning of hardware resources to implement nodes 301.

In some embodiments, node information 403 may further indicate a role and/or other distributed ledger type-specific information associated with each node 301. For example, assuming that distributed ledger network 303 (e.g., DLN_C) is associated with a HLF framework, node 301-1 may be a managing peer or an HLF manager, node 301-2 may be a committing peer, node 301-3 may be an ordering peer, node 301-N may be a peer, and so on. As discussed above, the roles may be assigned based on indications from LCS 101 of particular roles to be filled by respective nodes 301.

Access list 405 may as described above, indicate particular users, devices (e.g., UEs 103), and/or other entities that are authorized to access distributed ledger network 303 (e.g., DLN_C). In this example, access list 405 is associated with the entire distributed ledger network 303. In other examples, as discussed above, each node may be associated with its own respective access list 405, such as in situations where nodes 301 having different roles may be accessible by different users or other entities.

Figure 5:
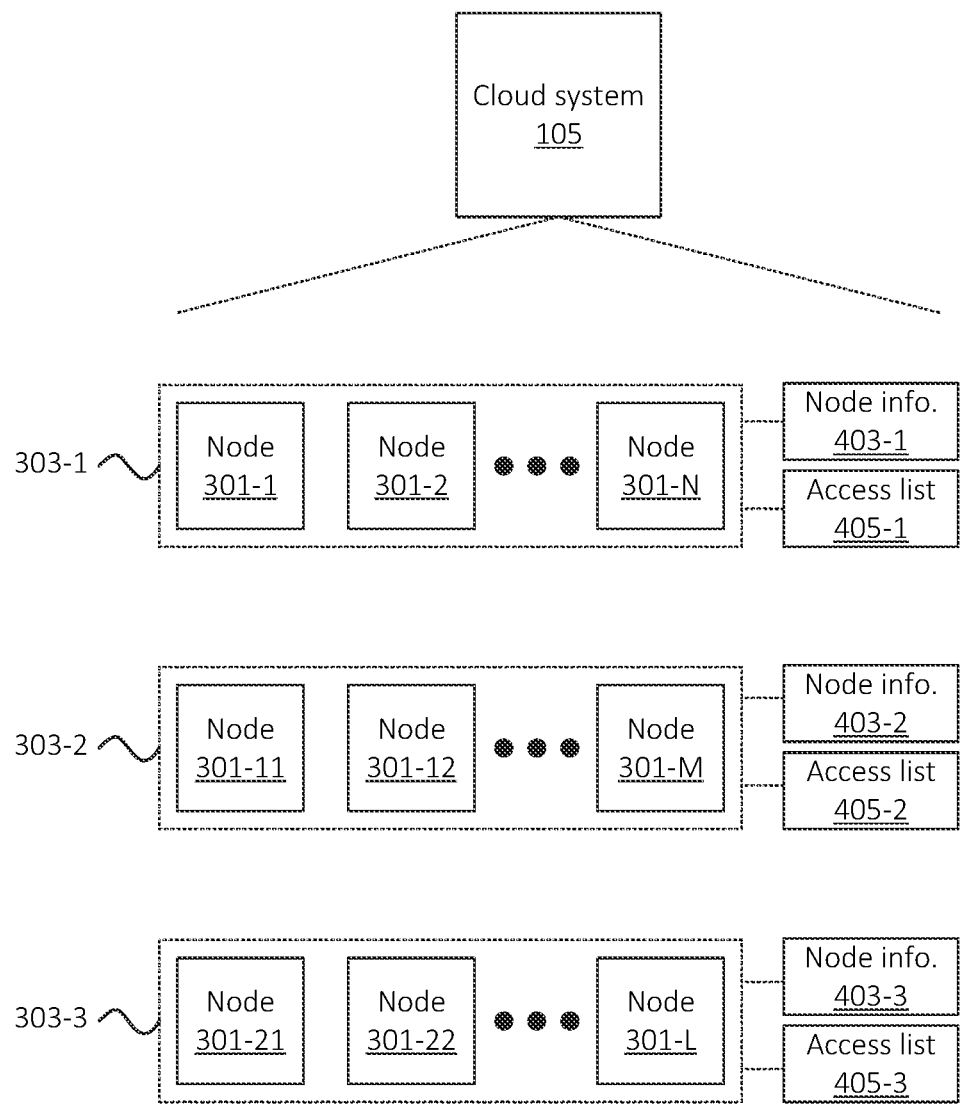
FIG. 5 illustrates an example of different sets of nodes provisioned based on different distributed ledger creation requests, in accordance with some embodiments.

As such, as shown in FIG. 5, cloud system 105 may maintain a respective set of node information 403, access list 405, and/or other suitable information for multiple distributed ledger networks 303, such as different distributed ledger networks 303 that have been created based on separate distributed ledger creation requests. For example, a first distributed ledger network 303-1 may include a first set of nodes 301-1 through 301-N and may be associated with first node information 403-1 and first access list 405-1, a second distributed ledger network 303-2 may include a second set of nodes 301-11 through 301-M and may be associated with second node information 403-2 and second access list 405-2, and a third distributed ledger network 303-3 may include a third set of nodes 301-21 through 301-L and may be associated with third node information 403-3 and third access list 405-3. In this manner, LCS 101 may be able to accommodate multiple distributed ledger network creation requests, in as much as LCS 101 may instruct cloud system 105 to create multiple different distributed ledger networks 303 with their own respective node information 403 and access lists 405.

Figure 6:
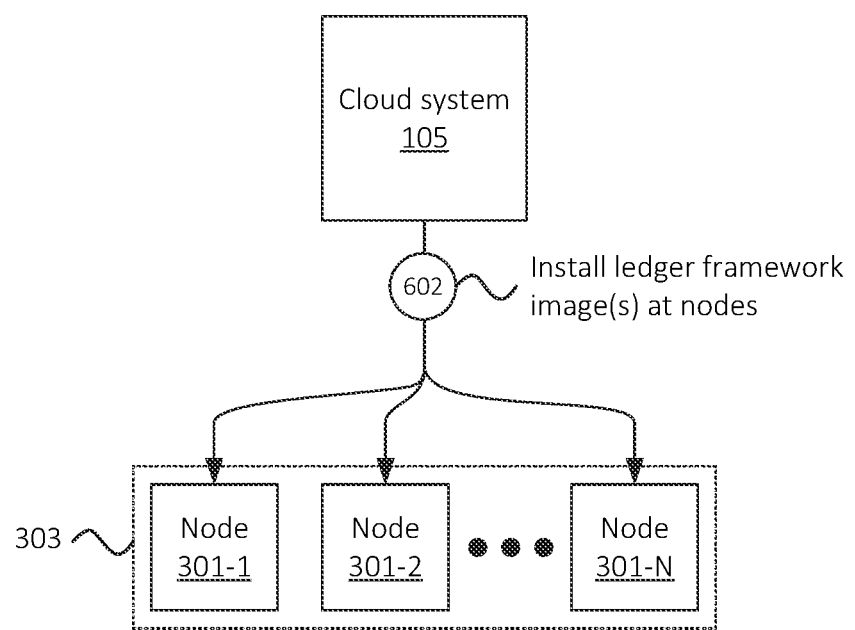
FIG. 6 illustrates an example of installing distributed ledger framework images at nodes based on a distributed ledger creation request, in accordance with some embodiments.

As shown in FIG. 6, instantiating nodes 301 (e.g., configuring resources of cloud system 105) may include installing (at 602) respective ledger images at respective nodes 301. For example, cloud system 105 may install one or more applications, APIs, software development kits ("SDKs"), modules, or the like, at nodes 301 of distributed ledger network 303 in accordance with parameters specified in the distributed ledger creation request and/or otherwise identified by LCS 101. For example, cloud system 105 may install node images associated with the HLF framework at nodes 301-1 through 301-N. Additionally, cloud system 105 may install a node image, modules, etc. associated with an HLF manager at one particular node (e.g., node 301-1), may install a node image, modules, etc. associated with a committing peer at node 301-2, and so on. Additionally, cloud system 105 may install one or more operating systems, libraries, dependencies, or the like at respective nodes 301, such that each node 301 is able to perform suitable functions in accordance with maintaining a distributed ledger and/or other suitable operations. In this sense, distributed ledger network 303 may be "spun up" or in a "ready" state once nodes 301 have been provisioned on hardware resources of cloud system 105, communication information has been established for distributed ledger network 303, and node images have been installed at nodes 301.

Figure 7:
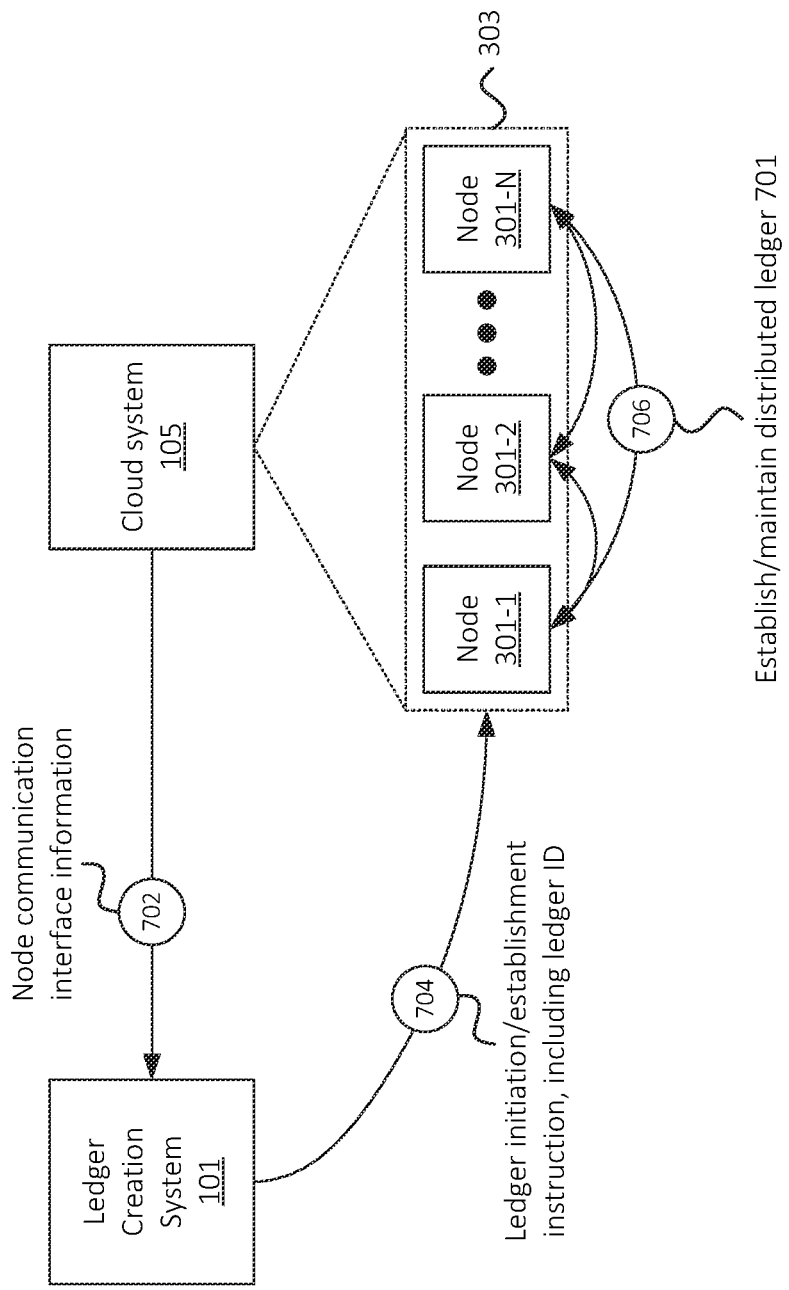
FIG. 7 illustrates an example of initiating a distributed ledger establish procedure at a set of nodes based on a distributed ledger creation request, in accordance with some embodiments.

Accordingly, as shown in FIG. 7, cloud system 105 may provide (at 702) node communication interface information to LCS 101, which may include some or all of node information 403 associated with the established distributed ledger network 303. For example, cloud system 105 may provide IP addresses, port numbers, etc. associated with some or all of nodes 301. Additionally, or alternatively, cloud system 105 may provide an IP address, port number, etc. associated with one particular node 301, such as a particular node 301 with the role of manager. Additionally, or alternatively, cloud system 105 may provide a public IP address, port number, etc. associated with distributed ledger network 303, which may be used by cloud system 105 for routing or forwarding communications to one or more nodes 301 of distributed ledger network 303. For example, cloud system 105 may use such IP address, port number, etc. as a "public" address for distributed ledger network 303, and may perform internal routing techniques, NAT, etc. to route communications to or from nodes 301 of distributed ledger network 303.

LCS 101 may use the provided information to communicate (at 704) with distributed ledger network 303 in order to initiate, start up, etc. a distributed ledger to be maintained by nodes 301 of distributed ledger network 303. For example, LCS 101 may issue a "create genesis block" instruction to distributed ledger network 303 (e.g., to a particular node 301 of distributed ledger network 303, and/or to an address provided by cloud system 105 that represents distributed ledger network 303 and is used by cloud system 105 and/or some other element to route communications to one or more nodes 301). Based on receiving the instruction (at 704), one or more nodes 301 of distributed ledger network 303 may establish and/or maintain (at 706) a particular distributed ledger (e.g., distributed ledger 701). For example, a particular node 301 designated as a leader, manager, etc. may generate a genesis block (e.g., a first or initial record) of distributed ledger 701, may distribute the genesis block to some or all other nodes 301, and/or may perform other suitable operations to initiate the maintaining of distributed ledger 701 by nodes 301 of distributed ledger network 303. In some embodiments, nodes 301 of distributed ledger network 303 may perform a suitable consensus technique to select or identify a particular node 301 that generates the genesis block. In some embodiments, establishing distributed ledger 701 may include establishing a channel (e.g., an HLF channel) associated with distributed ledger 701 or other suitable operations.

In some embodiments, the distributed ledger initiation or establishment instruction (at 704) may include some or all of the access list associated with the requested distributed ledger 701. For example, some or all nodes 301 may maintain information indicating users or devices that are authorized to access nodes 301, may maintain keys or authentication tokens, or may maintain other information that may be used to securely provide access to distributed ledger 701 to authorized entities, while restricting access by unauthorized entities.

Figure 8:
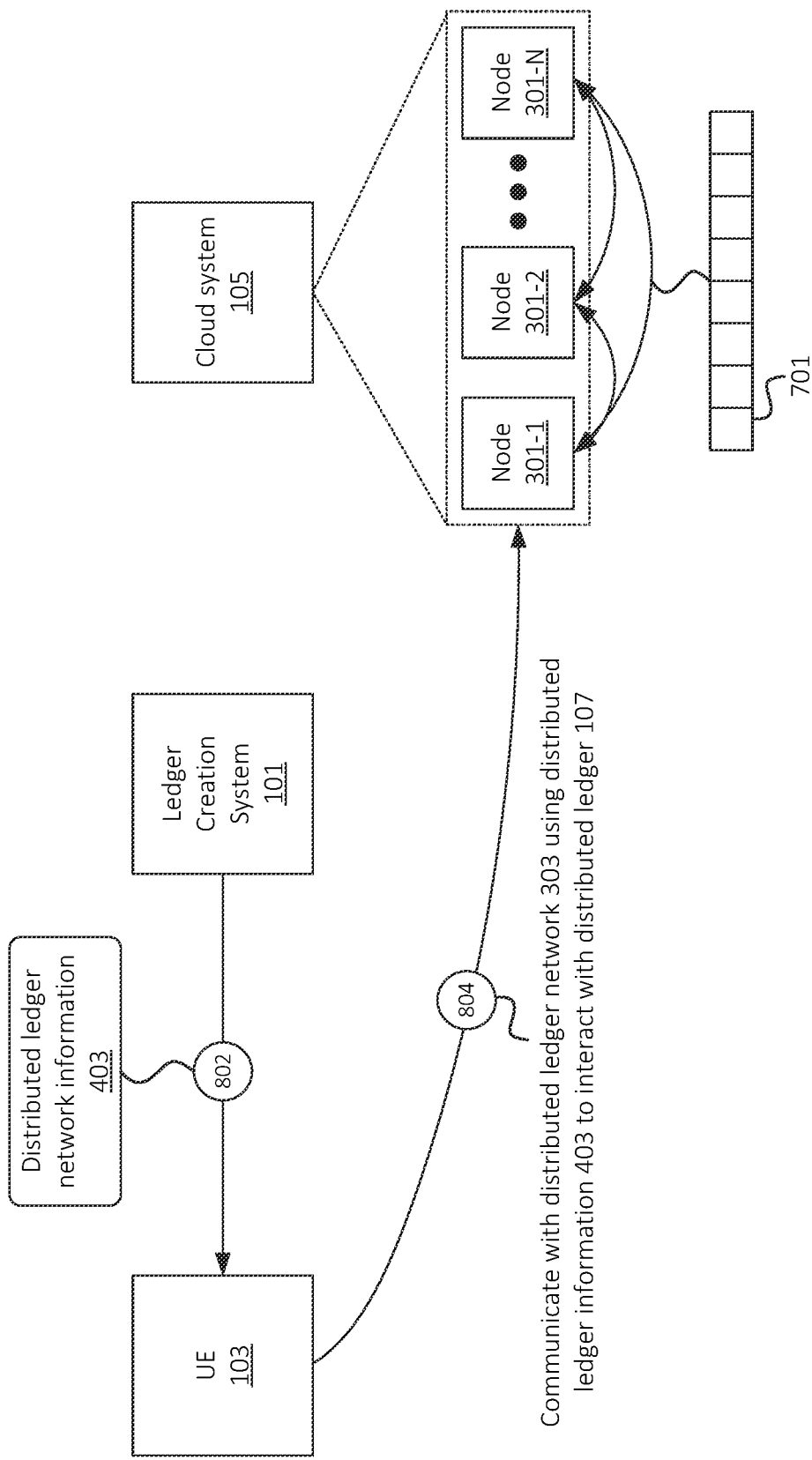
FIG. 8 illustrates an example of interacting with a distributed ledger created based on a distributed ledger creation request, in accordance with some embodiments.

As shown in FIG. 8, once LCS 101 has issued (at 704) the distributed ledger initiation or establishment instruction (e.g., once distributed ledger 701 has been established by nodes 301 of distributed ledger network 303), LCS 101 may provide (at 802) information regarding the established distributed ledger 701 and/or distributed ledger network 303 to UE 103 (e.g., the requestor). For example, LCS 101 may provide some or all of node information 403 to UE 103, which may include network information for one or more nodes 301 of distributed ledger network 303, as discussed above. In some embodiments, in addition to or in lieu of providing (at 802) the information to the particular UE 103 from which the distributed ledger creation request was initially received (e.g., at 102), LCS 101 may provide the information to one or more other devices or systems. For example, LCS 101 may provide the information to some or all devices or systems indicated in the access list associated with the request. Additionally, or alternatively, LCS 101 may provide the information to some other device or system.

UE 103 (and/or some other device or system that has received the information regarding nodes 301, distributed ledger network 303, and/or distributed ledger 701) may communicate (at 804) with one or more nodes 301 of distributed ledger network 303 using the provided information. For example, assuming that UE 103 and/or a user thereof has authorization (e.g., as indicated in the access list) to record information (e.g., a smart contract, a transaction record, an NFT or other asset creation, etc.) to distributed ledger 701, UE 103 may record information to distributed ledger 701 by providing an instruction to one or more nodes 301 of distributed ledger network 303 to record the information, and/or utilizing one or more other suitable techniques to record information to distributed ledger 701 by communicating with one or more nodes 301. Similarly, UE 103 may access information stored in distributed ledger 701 by communicating with one or more nodes 301 of distributed ledger network 303. In some embodiments, UE 103 may access metadata, world state information, and/or other information associated with distributed ledger 701 by communicating with one or more nodes 301 of distributed ledger network 303.

Nodes 301 of distributed ledger network 303 may communicate with each other to perform one or more operations relating to maintaining distributed ledger 701. For example, a particular node 301 may propose a record to record to distributed ledger 701, and one or more other nodes 301 may approve, validate, cross-validate, etc. the record (e.g., prior to the record being recorded, committed, etc. to distributed ledger 701). Approving, cross-validating, etc. may include providing values computed based on distributed ledger 701 and/or portions thereof, such as cryptographic hashes of some or all of distributed ledger 701, Merkle proofs, and/or other suitable information.

Figure 9:
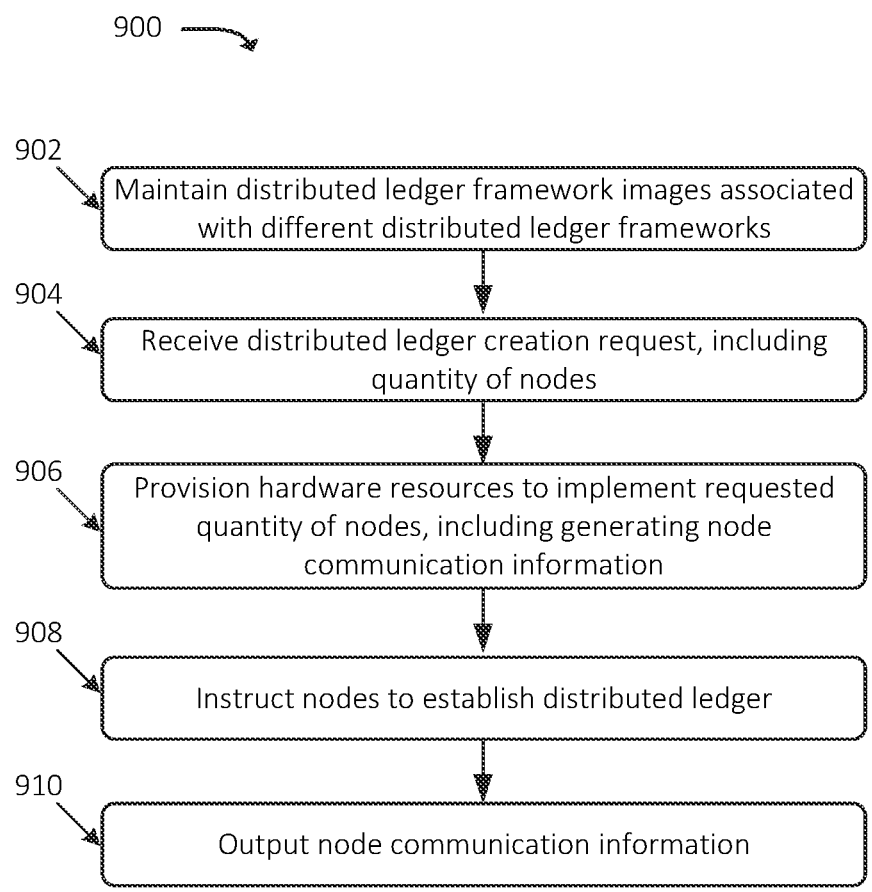
FIG. 9 illustrates an example process for establishing a distributed ledger network to maintain a distributed ledger based on a distributed ledger creation request, in accordance with some embodiments.

FIG. 9 illustrates an example process 900 for establishing a distributed ledger network to maintain a distributed ledger based on a distributed ledger creation request. In some embodiments, some or all of process 900 may be performed by LCS 101. In some embodiments, one or more other devices may perform some or all of process 900 in concert with and/or in lieu of LCS 101, such as cloud system 105.

As shown, process 900 may include maintaining (at 902) a set of distributed ledger framework images associated with different distributed ledger frameworks. For example, LCS 101 may maintain or receive (e.g., from ledger image repository 201) images, containers, modules, etc. that may be installed or executed (e.g., at a virtual machine, a virtualized environment, a bare metal machine, etc.) in order to perform one or more operations associated with a distributed ledger, such as establishing the distributed ledger, validating records recorded to the distributed ledger, etc. For example, LCS 101 may maintain or receive a first set of distributed ledger images associated with a first distributed ledger framework (e.g., an HLF framework), a second set of distributed ledger images associated with a second distributed ledger framework (e.g., an EVM framework), etc. In some embodiments, one framework may be associated with different versions or other parameters, and LCS 101 may maintain or receive a discrete set of images for each version or other set of parameters. In some embodiments, LCS 101 may receive or maintain libraries, dependencies, and/or other images that are associated with particular distributed ledger framework images. In some embodiments, LCS 101 may utilize AI/ML techniques and/or other suitable techniques in order to associate different distributed ledger images with respective libraries, dependencies, etc.

Process 900 may further include receiving (at 904) a distributed ledger creation request. For example, LCS 101 may receive the distributed ledger creation request from a particular UE 301. The distributed ledger creation request may specify a quantity of nodes and/or other parameters, such as a requested distributed ledger framework or type, hardware and/or performance specifications or some or all of the nodes, an access list, and/or other suitable information.

Process 900 may additionally include provisioning (at 906) hardware resources to implement the requested quantity of nodes. For example, LCS 101 may instruct cloud system 105, an orchestration platform, a hypervisor, etc. to implement the requested quantity of nodes. Provisioning the hardware resources may include, for example, provisioning discrete sets of hardware resources, virtual machines, etc. to implement different nodes. For instance, one set of hardware resources of cloud system 105 may be provisioned to implement one virtual machine on which one node is implemented (e.g., one or more ledger framework images may be installed on the hardware resources), another set of hardware resources of cloud system 105 may be provisioned to implement another virtual machine on which another node is implemented, and so on.

Provisioning the hardware resources may also include generating communication information for each node. For example, each provisioned set of hardware resources (e.g., each virtual machine, each container, etc.) may be associated with a respective IP address, port number, logical name, and/or other suitable address or identifier, based on which each node may receive communications (e.g., from other nodes, from cloud system 105, from an orchestration platform, etc.). LCS 101 and/or cloud system 105 may for example, generate a routing table, an address list, and/or other suitable information indicating the respective communication information for each node. In some embodiments, LCS 101 and/or cloud system 105 may generate or identify an IP address or other identifier to represent multiple (e.g., all, or fewer than all) nodes associated with the distributed ledger creation request (e.g., a distributed ledger network that includes such nodes). In such embodiments, LCS 101 and/or cloud system 105 may perform routing, network address translation, and/or other techniques in order to route traffic, sent to the distributed ledger network, to one or more of the nodes of the distributed ledger network.

Process 900 may also include instructing (at 908) the nodes to establish or initialize the distributed ledger. For example, LCS 101 may use the communication information (e.g., for the distributed ledger network and/or for one or more particular nodes) to instruct the nodes to generate a genesis record or block, communicate with each other to distribute, validate, and maintain the genesis record or block, and/or to otherwise establish or maintain the requested distributed ledger. In some embodiments, as discussed above, establishing the distributed ledger may include establishing an access list which indicates authorized entities that are authorized to access the distributed ledger, and/or which otherwise included authentication information (e.g., keys, authentication tokens, etc.) that may be used to authenticate and/or verify authorization of particular entities to access the distributed ledger.

Process 900 may further include outputting (at 910) the node communication information. For example, LCS 101 may output the information to a requestor (e.g., UE 301 from which the request (at 902) was received). Additionally, or alternatively, LCS 101 may output the information to some other device or system, such as a device or system indicated in an access list specified in the distributed ledger creation request. UE 301 and/or other authorized entities (e.g., in the example of a private or permissioned distributed ledger) may access the distributed ledger using the communication information. For example, UE 301 may request some or all records of the distributed ledger from a particular node or from the distributed ledger network (e.g., using communication information for the distributed ledger network and for which cloud system 105 or a particular node of the distributed ledger network routes the request appropriately), may request that a record be recorded to the distributed ledger, and/or other suitable interactions. In this manner, as discussed above, the distributed ledger may be established and maintained by a desired quantity or type of sets of hardware resources (e.g., nodes) without the need to manually provision the hardware resources, install distributed ledger framework images at the resources, and/or other operations, thereby simplifying and streamlining the distributed ledger creation process.

Figure 10:
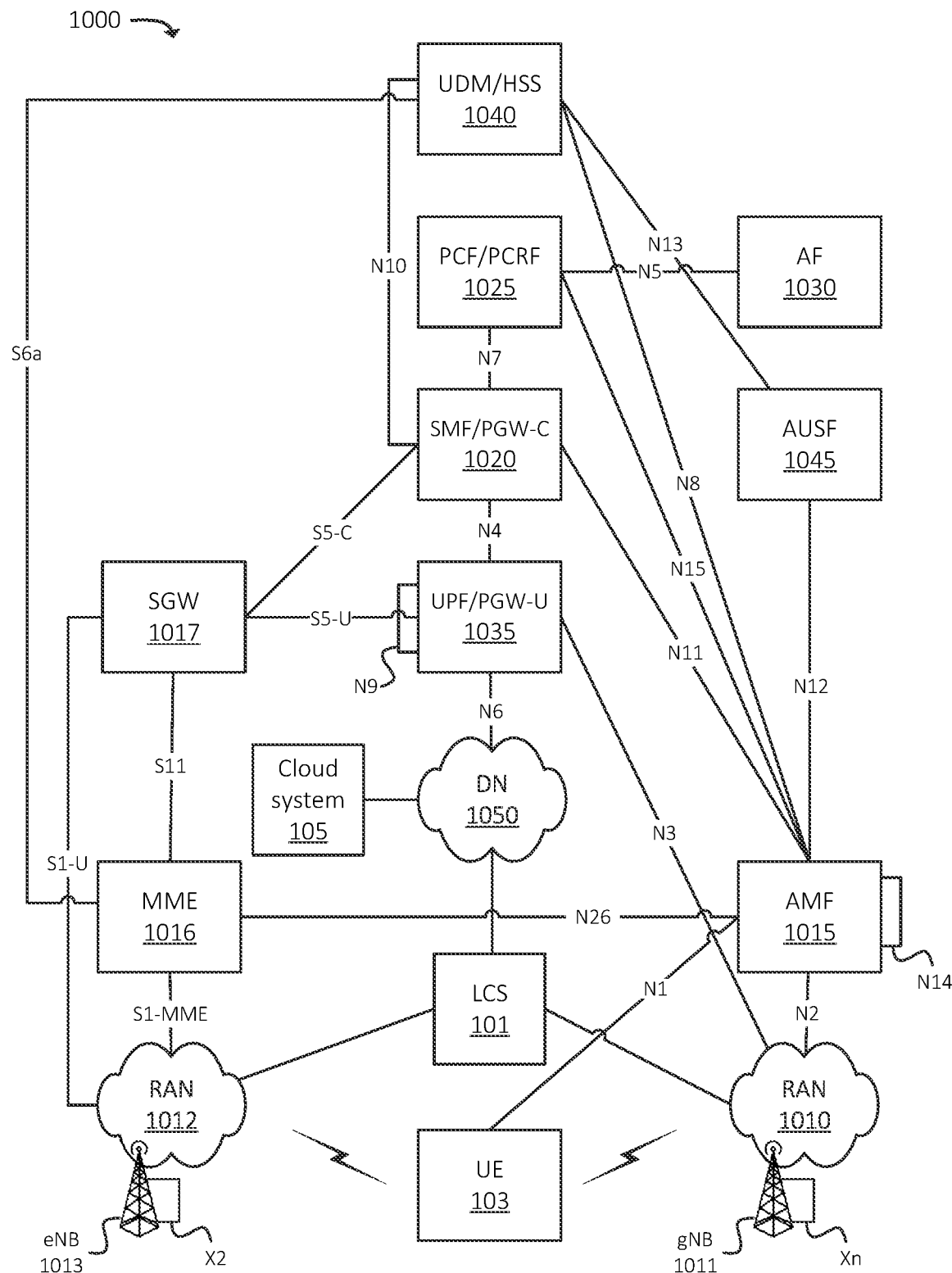
FIG. 10 illustrates an example environment in which one or more embodiments, described herein, may be implemented.

FIG. 10 illustrates an example environment 1000, in which one or more embodiments may be implemented. In some embodiments, environment 1000 may correspond to a Fifth Generation ("5G") network, and/or may include elements of a 5G network. In some embodiments, environment 1000 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 1000 may represent or may include a 5G core ("5GC"). As shown, environment 1000 may include UE 103, RAN 1010 (which may include one or more Next Generation Node Bs ("gNBs") 1011), RAN 1012 (which may include one or more evolved Node Bs ("eNBs") 1013), and various network functions such as Access and Mobility Management Function ("AMF") 1015, Mobility Management Entity ("MME") 1016, Serving Gateway ("SGW") 1017, Session Management Function ("SMF")/Packet Data Network ("PDN") Gateway ("PGW")-Control plane function ("PGW-C") 1020, Policy Control Function ("PCF")/Policy Charging and Rules Function ("PCRF") 1025, Application Function ("AF") 1030, User Plane Function ("UPF")/PGW-User plane function ("PGW-U") 1035, Unified Data Management ("UDM")/Home Subscriber Server ("HSS") 1040, and Authentication Server Function ("AUSF") 1045. Environment 1000 may also include one or more networks, such as Data Network ("DN") 1050. Environment 1000 may include one or more additional devices or systems communicatively coupled to one or more networks (e.g., DN 1050), such as LCS 101 and cloud system 105.

The example shown in FIG. 10 illustrates one instance of each network component or function (e.g., one instance of SMF/PGW-C 1020, PCF/PCRF 1025, UPF/PGW-U 1035, UDM/HSS 1040, and/or AUSF 1045). In practice, environment 1000 may include multiple instances of such components or functions. For example, in some embodiments, environment 1000 may include multiple "slices" of a core network, where each slice includes a discrete and/or logical set of network functions (e.g., one slice may include a first instance of SMF/PGW-C 1020, PCF/PCRF 1025, UPF/PGW-U 1035, UDM/HSS 1040, and/or AUSF 1045, while another slice may include a second instance of SMF/PGW-C 1020, PCF/PCRF 1025, UPF/PGW-U 1035, UDM/HSS 1040, and/or AUSF 1045). The different slices may provide differentiated levels of service, such as service in accordance with different Quality of Service ("QoS") parameters.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. Alternatively, or additionally, one or more of the devices of environment 1000 may perform one or more network functions described as being performed by another one or more of the devices of environment 1000. Devices of environment 1000 may interconnect with each other and/or other devices via wired connections, wireless connections, or a combination of wired and wireless connections. In some implementations, one or more devices of environment 1000 may be physically integrated in, and/or may be physically attached to, one or more other devices of environment 1000.

UE 103 may include a computation and communication device, such as a wireless mobile communication device that is capable of communicating with RAN 1010, RAN 1012, and/or DN 1050. UE 103 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 103 may send traffic to and/or receive traffic (e.g., user plane traffic) from DN 1050 via RAN 1010, RAN 1012, and/or UPF/PGW-U 1035.

RAN 1010 may be, or may include, a 5G RAN that includes one or more base stations (e.g., one or more gNBs 1011), via which UE 103 may communicate with one or more other elements of environment 1000. UE 103 may communicate with RAN 1010 via an air interface (e.g., as provided by gNB 1011). For instance, RAN 1010 may receive traffic (e.g., user plane traffic such as voice call traffic, data traffic, messaging traffic, etc.) from UE 103 via the air interface, and may communicate the traffic to UPF/PGW-U 1035 and/or one or more other devices or networks. Further, RAN 1010 may receive signaling traffic, control plane traffic, etc. from UE 103 via the air interface, and may communicate such signaling traffic, control plane traffic, etc. to AMF 1015 and/or one or more other devices or networks. Additionally, RAN 1010 may receive traffic intended for UE 103 (e.g., from UPF/PGW-U 1035, AMF 1015, and/or one or more other devices or networks) and may communicate the traffic to UE 103 via the air interface. In some embodiments, one or more nodes 301 may be implemented by one or more UEs 103. Additionally, or alternatively, in some embodiments, one or more nodes 103 may be implemented by cloud system 105.

RAN 1012 may be, or may include, a LTE RAN that includes one or more base stations (e.g., one or more eNBs 1013), via which UE 103 may communicate with one or more other elements of environment 1000. UE 103 may communicate with RAN 1012 via an air interface (e.g., as provided by eNB 1013). For instance, RAN 1012 may receive traffic (e.g., user plane traffic such as voice call traffic, data traffic, messaging traffic, signaling traffic, etc.) from UE 103 via the air interface, and may communicate the traffic to UPF/PGW-U 1035 (e.g., via SGW 1017) and/or one or more other devices or networks. Further, RAN 1012 may receive signaling traffic, control plane traffic, etc. from UE 103 via the air interface, and may communicate such signaling traffic, control plane traffic, etc. to MME 1016 and/or one or more other devices or networks. Additionally, RAN 1012 may receive traffic intended for UE 103 (e.g., from UPF/PGW-U 1035, MME 1016, SGW 1017, and/or one or more other devices or networks) and may communicate the traffic to UE 103 via the air interface.

AMF 1015 may include one or more devices, systems, Virtualized Network Functions ("VNFs"), Cloud-Native Network Functions ("CNFs"), etc., that perform operations to register UE 103 with the 5G network, to establish bearer channels associated with a session with UE 103, to hand off UE 103 from the 5G network to another network, to hand off UE 103 from the other network to the 5G network, manage mobility of UE 103 between RANs 1010 and/or gNBs 1011, and/or to perform other operations. In some embodiments, the 5G network may include multiple AMFs 1015, which communicate with each other via the N14 interface (denoted in FIG. 10 by the line marked "N14" originating and terminating at AMF 1015).

MME 1016 may include one or more devices, systems, VNFs, CNFs, etc., that perform operations to register UE 103 with the EPC, to establish bearer channels associated with a session with UE 103, to hand off UE 103 from the EPC to another network, to hand off UE 103 from another network to the EPC, manage mobility of UE 103 between RANs 1012 and/or eNBs 1013, and/or to perform other operations.

SGW 1017 may include one or more devices, systems, VNFs, CNFs, etc., that aggregate traffic received from one or more eNBs 1013 and send the aggregated traffic to an external network or device via UPF/PGW-U 1035. Additionally, SGW 1017 may aggregate traffic received from one or more UPF/PGW-Us 1035 and may send the aggregated traffic to one or more eNBs 1013. SGW 1017 may operate as an anchor for the user plane during inter-eNB handovers and as an anchor for mobility between different telecommunication networks or RANs (e.g., RANs 1010 and 1012).

SMF/PGW-C 1020 may include one or more devices, systems, VNFs, CNFs, etc., that gather, process, store, and/or provide information in a manner described herein. SMF/PGW-C 1020 may or example, facilitate the establishment of communication sessions on behalf of UE 103. In some embodiments, the establishment of communications sessions may be performed in accordance with one or more policies provided by PCF/PCRF 1025.

PCF/PCRF 1025 may include one or more devices, systems, VNFs, CNFs, etc., that aggregate information to and from the 5G network and/or other sources. PCF/PCRF 1025 may receive information regarding policies and/or subscriptions from one or more sources, such as subscriber databases and/or from one or more users (such as, for example, an administrator associated with PCF/PCRF 1025).

AF 1030 may include one or more devices, systems, VNFs, CNFs, etc., that receive, store, and/or provide information that may be used in determining parameters (e.g., quality of service parameters, charging parameters, or the like) for certain applications.

UPF/PGW-U 1035 may include one or more devices, systems, VNFs, CNFs, etc., that receive, store, and/or provide data (e.g., user plane data). For example, UPF/PGW-U 1035 may receive user plane data (e.g., voice call traffic, data traffic, etc.), destined for UE 103, from DN 1050, and may forward the user plane data toward UE 103 (e.g., via RAN 1010, SMF/PGW-C 1020, and/or one or more other devices). In some embodiments, multiple UPFs 1035 may be deployed (e.g., in different geographical locations), and the delivery of content to UE 103 may be coordinated via the N9 interface (e.g., as denoted in FIG. 10 by the line marked "N9" originating and terminating at UPF/PGW-U 1035). Similarly, UPF/PGW-U 1035 may receive traffic from UE 103 (e.g., via RAN 1010, RAN 1012, SMF/PGW-C 1020, and/or one or more other devices), and may forward the traffic toward DN 1050. In some embodiments, UPF/PGW-U 1035 may communicate (e.g., via the N4 interface) with SMF/PGW-C 1020, regarding user plane data processed by UPF/PGW-U 1035.

UDM/HSS 1040 and AUSF 1045 may include one or more devices, systems, VNFs, CNFs, etc., that manage, update, and/or store, in one or more memory devices associated with AUSF 1045 and/or UDM/HSS 1040, profile information associated with a subscriber. AUSF 1045 and/or UDM/HSS 1040 may perform authentication, authorization, and/or accounting operations associated with the subscriber and/or a communication session with UE 103.

DN 1050 may include one or more wired and/or wireless networks. For example, DN 1050 may include an Internet Protocol ("IP")-based PDN, a wide area network ("WAN") such as the Internet, a private enterprise network, and/or one or more other networks. UE 103 may communicate, through DN 1050, with data servers, other UEs 103, and/or to other servers or applications that are coupled to DN 1050. DN 1050 may be connected to one or more other networks, such as a public switched telephone network ("PSTN"), a public land mobile network ("PLMN"), and/or another network. DN 1050 may be connected to one or more devices, such as content providers, applications, web servers, and/or other devices, with which UE 103 may communicate.

Figure 11:
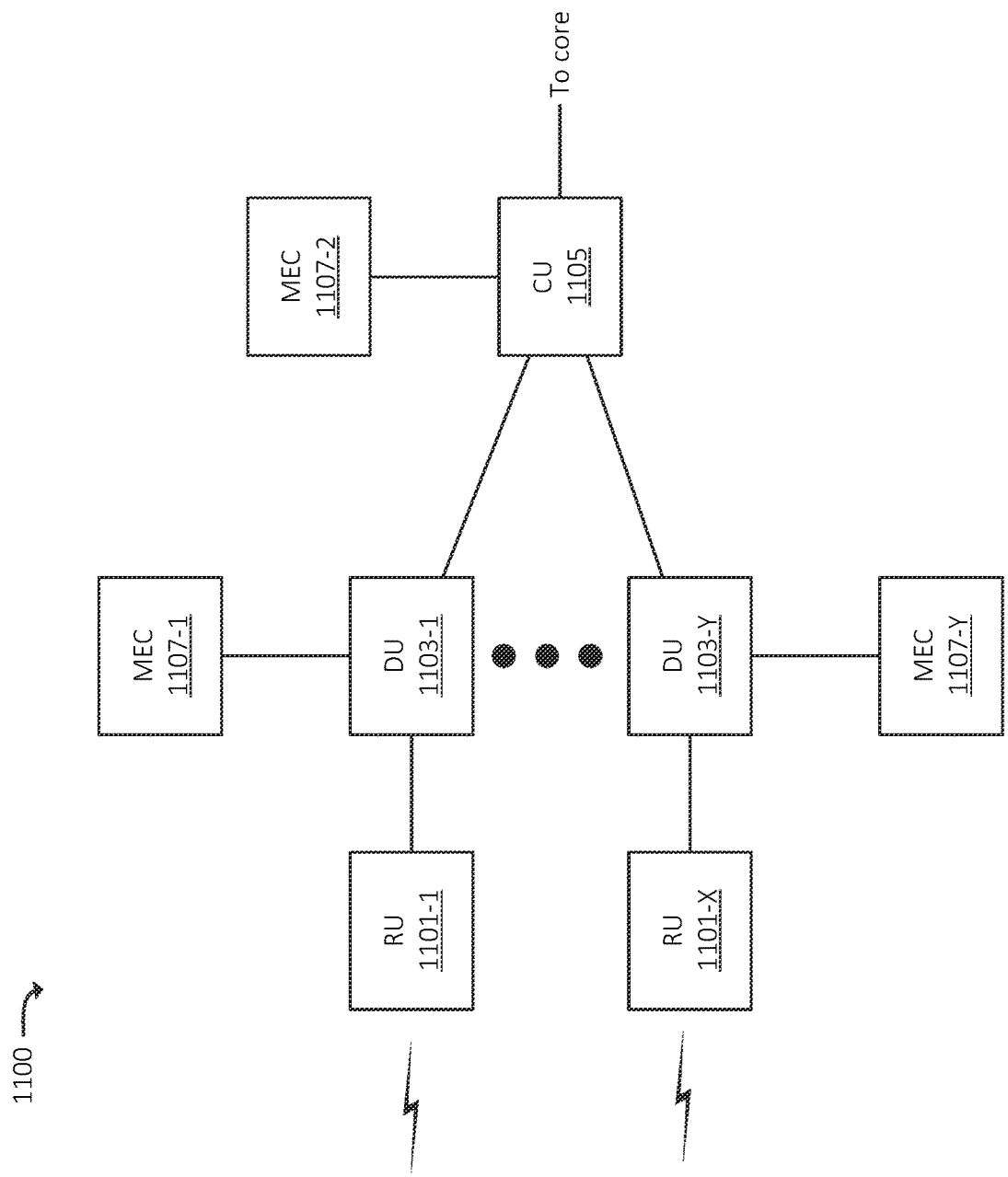
FIG. 11 illustrates an example arrangement of a radio access network ("RAN"), in accordance with some embodiments.

FIG. 11 illustrates an example RAN environment 1100, which may be included in and/or implemented by one or more RANs (e.g., RAN 1010, RAN 1012, or some other RAN). In some embodiments, a particular RAN may include one RAN environment 1100. In some embodiments, a particular RAN may include multiple RAN environments 1100. In some embodiments, RAN environment 1100 may correspond to a particular gNB 1011 of a 5G RAN (e.g., RAN 1010). In some embodiments, RAN environment 1100 may correspond to multiple gNBs 1011. In some embodiments, RAN environment 1100 may correspond to one or more other types of base stations of one or more other types of RANs. As shown, RAN environment 1100 may include Central Unit ("CU") 1105, one or more Distributed Units ("DUs") 1103-1 through 1103-Y (referred to individually as "DU 1103," or collectively as "DUs 1103"), and one or more Radio Units ("RUs") 1101-1 through 1101-X (referred to individually as "RU 1101," or collectively as "RUs 1101").

CU 1105 may communicate with a core of a wireless network (e.g., may communicate with one or more of the devices or systems described above with respect to FIG. 10, such as AMF 1015 and/or UPF/PGW-U 1035). In the uplink direction (e.g., for traffic from UEs 103 to a core network), CU 1105 may aggregate traffic from DUs 1103, and forward the aggregated traffic to the core network. In some embodiments, CU 1105 may receive traffic according to a given protocol (e.g., Radio Link Control ("RLC")) from DUs 1103, and may perform higher-layer processing (e.g., may aggregate/process RLC packets and generate Packet Data Convergence Protocol ("PDCP") packets based on the RLC packets) on the traffic received from DUs 1103.

In accordance with some embodiments, CU 1105 may receive downlink traffic (e.g., traffic from the core network) for a particular UE 103, and may determine which DU(s) 1103 should receive the downlink traffic. DU 1103 may include one or more devices that transmit traffic between a core network (e.g., via CU 1105) and UE 103 (e.g., via a respective RU 1101). DU 1103 may or example, receive traffic from RU 1101 at a first layer (e.g., physical ("PHY") layer traffic, or lower PHY layer traffic), and may process/aggregate the traffic to a second layer (e.g., upper PHY and/or RLC). DU 1103 may receive traffic from CU 1105 at the second layer, may process the traffic to the first layer, and provide the processed traffic to a respective RU 1101 for transmission to UE 103.

RU 1101 may include hardware circuitry (e.g., one or more RF transceivers, antennas, radios, and/or other suitable hardware) to communicate wirelessly (e.g., via an RF interface) with one or more UEs 103, one or more other DUs 1103 (e.g., via RUs 1101 associated with DUs 1103), and/or any other suitable type of device. In the uplink direction, RU 1101 may receive traffic from UE 103 and/or another DU 1103 via the RF interface and may provide the traffic to DU 1103. In the downlink direction, RU 1101 may receive traffic from DU 1103, and may provide the traffic to UE 103 and/or another DU 1103.

One or more elements of RAN environment 1100 may, in some embodiments, be communicatively coupled to one or more Multi-Access/Mobile Edge Computing ("MEC") devices, referred to sometimes herein simply as "MECs" 1107. For example, DU 1103-1 may be communicatively coupled to MEC 1107-1, DU 1103-Y may be communicatively coupled to MEC 1107-Y, CU 1105 may be communicatively coupled to MEC 1107-2, and so on. MECs 1107 may include hardware resources (e.g., configurable or provisionable hardware resources) that may be configured to provide services and/or otherwise process traffic to and/or from UE 103, via a respective RU 1101.

For example, DU 1103-1 may route some traffic, from UE 103, to MEC 1107-1 instead of to a core network via CU 1105. MEC 1107-1 may process the traffic, perform one or more computations based on the received traffic, and may provide traffic to UE 103 via RU 1101-1. In some embodiments, MEC 1107 may include, and/or may implement, some or all of the functionality described above with respect to LCS 101, cloud system 105, nodes 301, AF 1030, UPF 1035, and/or one or more other devices, systems, VNFs, CNFs, etc. In this manner, ultra-low latency services may be provided to UE 103, as traffic does not need to traverse DU 1103, CU 1105, links between DU 1103 and CU 1105, and an intervening backhaul network between RAN environment 1100 and the core network.

Figure 12:
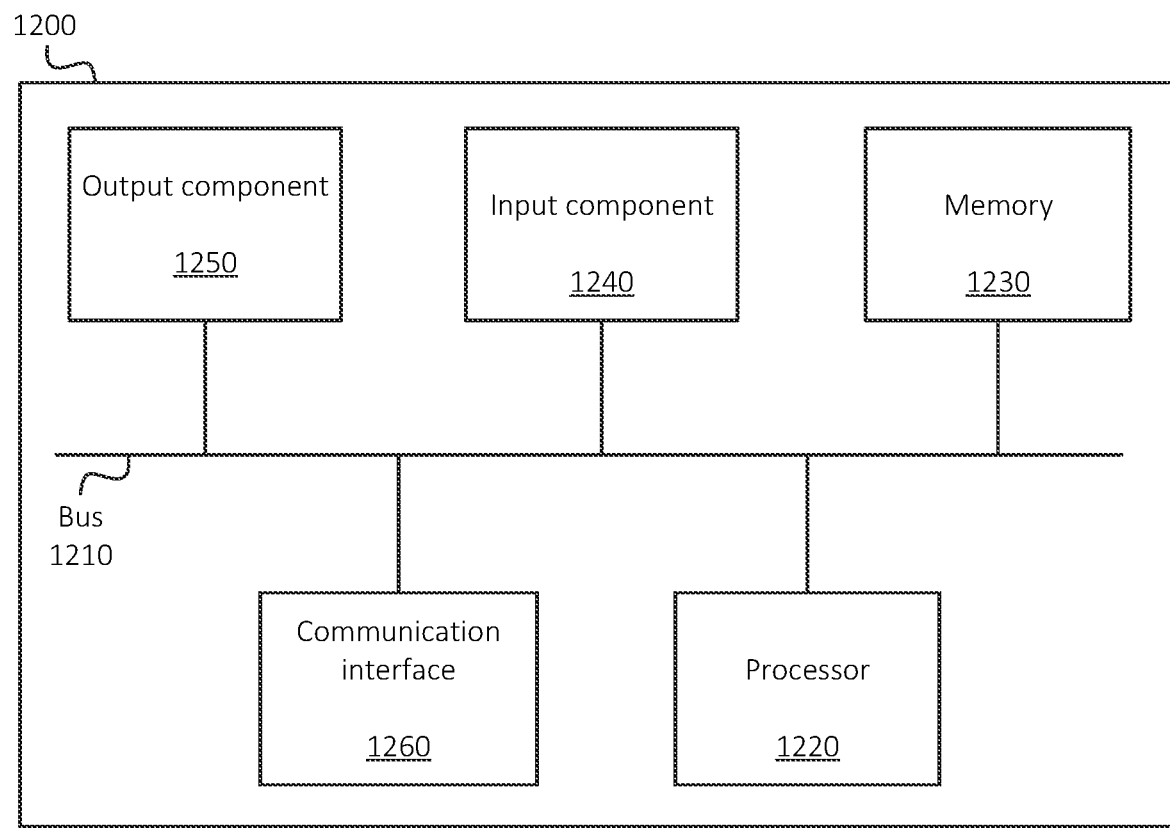
FIG. 12 illustrates example components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260.

In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. In some embodiments, processor 1220 may be or may include one or more hardware processors. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200 and/or other receives or detects input from a source external to 1240, such as a touchpad, a touchscreen, a keyboard, a keypad, a button, a switch, a microphone or other audio input component, etc. In some embodiments, input component 1240 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-9), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance.

Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive a distributed ledger creation request, wherein the distributed ledger creation request specifies a quantity of nodes;
provision a plurality of sets of hardware resources to implement a plurality of nodes, wherein the plurality of nodes includes the requested quantity of nodes, wherein
provisioning the plurality of sets of hardware resources includes generating communication information associated with each node of the plurality of nodes;
instruct at least one node, of the plurality of nodes, to establish a distributed ledger, wherein the at least one node uses the communication information, associated with each node of the plurality of nodes, to communicate with one or more other nodes of the plurality of nodes to establish the distributed ledger;
generate particular communication information associated with the established distributed ledger;
output, in response to the distributed ledger creation request, the particular communication information associated with the established distributed ledger;
receive a request to access the established distributed ledger, wherein the request is associated with the particular communication information; and
forward, based on the particular communication information associated with the request, the request to one or more nodes of the plurality of nodes.

2. The device of claim 1, wherein the request is received from a particular User Equipment ("UE"), and wherein outputting the particular communication information associated with the established distributed ledger includes outputting the particular communication information to the particular UE.

3. The device of claim 2, wherein the UE communicates with the device to interact with the distributed ledger.

4. The device of claim 3, wherein interacting with the distributed ledger includes at least one of:
providing information to be recorded to the distributed ledger, or
accessing information previously recorded to the distributed ledger.

5. The device of claim 1, wherein the distributed ledger creation request includes an access list that specifies a set of entities that are authorized to access the distributed ledger, wherein the distributed ledger is a permissioned distributed ledger for which access is restricted to the entities specified in the access list.

6. The device of claim 1, wherein the distributed ledger creation request specifies a particular distributed ledger framework, wherein provisioning the plurality of sets of hardware resources to implement the plurality of nodes includes:
selecting one or more images, associated with the particular distributed ledger framework, from a plurality of images that are associated with a plurality of different distributed ledger frameworks; and installing the one or more images at the plurality of sets of hardware resources.

7. The device of claim 1, wherein the plurality of sets of hardware resources each implement a virtual machine, wherein each node of the plurality of nodes is associated with a respective virtual machine implemented by a particular set of hardware resources.

8. A non-transitory computer-readable medium, storing a plurality of processor-executable instructions to:
receive a distributed ledger creation request, wherein the distributed ledger creation request specifies a quantity of nodes;
provision a plurality of sets of hardware resources to implement a plurality of nodes, wherein the plurality of nodes includes the requested quantity of nodes, wherein provisioning the plurality of sets of hardware resources includes generating communication information associated with each node of the plurality of nodes;
instruct at least one node, of the plurality of nodes, to establish a distributed ledger, wherein the at least one node uses the communication information, associated with each node of the plurality of nodes, to communicate with one or more other nodes of the plurality of nodes to establish the distributed ledger; generate particular communication information associated with the established distributed ledger;
output, in response to the distributed ledger creation request, the particular communication information associated with the established distributed ledger;
receive a request to access the established distributed ledger, wherein the request is associated with the particular communication information; and
forward, based on the particular communication information associated with the request, the request to one or more nodes of the plurality of nodes.

9. The non-transitory computer-readable medium of claim 8, wherein the request is received from a particular User Equipment ("UE"), and wherein outputting the particular communication information associated with the established distributed ledger includes outputting the particular communication information to the particular UE.

10. The non-transitory computer-readable medium of claim 9, wherein the UE uses the particular communication information to interact with the distributed ledger.

11. The non-transitory computer-readable medium of claim 10, wherein interacting with the distributed ledger includes at least one of:
providing information to be recorded to the distributed ledger, or
accessing information previously recorded to the distributed ledger.

12. The non-transitory computer-readable medium of claim 8, wherein the distributed ledger creation request includes an access list that specifies a set of entities that are authorized to access the distributed ledger, wherein the distributed ledger is a permissioned distributed ledger for which access is restricted to the entities specified in the access list.

13. The non-transitory computer-readable medium of claim 8, wherein the distributed ledger creation request specifies a particular distributed ledger framework, wherein provisioning the plurality of sets of hardware resources to implement the plurality of nodes includes:
selecting one or more images, associated with the particular distributed ledger framework, from a plurality of images that are associated with a plurality of different distributed ledger frameworks; and
installing the one or more images at the plurality of sets of hardware resources.

14. The non-transitory computer-readable medium of claim 8, wherein the plurality of sets of hardware resources each implement a virtual machine, wherein each node of the plurality of nodes is associated with a respective virtual machine implemented by a particular set of hardware resources.

15. A method, comprising:
receiving a distributed ledger creation request, wherein the distributed ledger creation request specifies a quantity of nodes;
provisioning a plurality of sets of hardware resources to implement a plurality of nodes, wherein the plurality of nodes includes the requested quantity of nodes, wherein provisioning the plurality of sets of hardware resources includes generating communication information associated with each node of the plurality of nodes;
instructing at least one node, of the plurality of nodes, to establish a distributed ledger, wherein the at least one node uses the communication information, associated with each node of the plurality of nodes, to communicate with one or more other nodes of the plurality of nodes to establish the distributed ledger;
generating particular communication information associated with the established distributed ledger;
outputting, in response to the distributed ledger creation request, the particular communication information associated with the distributed ledger;
receiving a request to access the established distributed ledger, wherein the request is associated with the particular communication information; and
forwarding, based on the particular communication information associated with the request, the request to one or more nodes of the plurality of nodes.

16. The method of claim 15, wherein the request is received from a particular User Equipment ("UE"), and wherein outputting the particular communication information associated with the established distributed ledger includes outputting the particular communication information to the particular UE.

17. The method of claim 16, wherein the UE uses the particular communication information to interact with the distributed ledger, wherein interacting with the distributed ledger includes at least one of:
providing information to be recorded to the distributed ledger, or
accessing information previously recorded to the distributed ledger.

18. The method of claim 15, wherein the distributed ledger creation request includes an access list that specifies a set of entities that are authorized to access the distributed ledger, wherein the distributed ledger is a permissioned distributed ledger for which access is restricted to the entities specified in the access list.

19. The method of claim 15, wherein the distributed ledger creation request specifies a particular distributed ledger framework, wherein provisioning the plurality of sets of hardware resources to implement the plurality of nodes includes:
selecting one or more images, associated with the particular distributed ledger framework, from a plurality of images that are associated with a plurality of different distributed ledger frameworks; and
installing the one or more images at the plurality of sets of hardware resources.

20. The method of claim 15, wherein the plurality of sets of hardware resources each implement a virtual machine, wherein each node of the plurality of nodes is associated with a respective virtual machine implemented by a particular set of hardware resources.

\* \* \* \* \*